United States Patent [19]

Sato et al.

[11] Patent Number: 4,629,305
[45] Date of Patent: Dec. 16, 1986

[54] AUTOMATIC EXPOSURE CAMERA

[75] Inventors: Osamu Sato; Eiichi Tano; Kiyoshi Negishi, all of Tokyo, Japan

[73] Assignee: Asahi Kogaku Kogyo K.K., Tokyo, Japan

[21] Appl. No.: 703,563

[22] Filed: Feb. 20, 1985

[30] Foreign Application Priority Data

Feb. 20, 1984 [JP] Japan .................................. 59-29773

[51] Int. Cl.$^4$ ............................................ G03B 7/097
[52] U.S. Cl. ................................ 354/442; 354/289.12
[58] Field of Search .................... 354/441, 442, 289.1, 354/289.11, 289.12

[56] References Cited

U.S. PATENT DOCUMENTS 4,171,884 10/1979 Tokutomi et al. .................. 354/442
4,286,849 9/1981 Uchidoi et al. ..................... 354/442
4,483,601 11/1984 Sekida et al. .................... 354/289.1
4,497,564 2/1985 Meguro et al. ................... 354/289.1
4,538,891 9/1985 Matsuyama et al. ............. 354/289.1

Primary Examiner—Russell E. Adams
Attorney, Agent, or Firm—Sughrue, Mion, Zinn, Macpeak & Seas

[57] ABSTRACT

An automatic exposure camera in which any one of four modes, specifically, an aperture-priority automatic exposure mode, a shutter-speed-priority automatic exposure mode, a programmed automatic exposure mode and a manual exposure mode, can be readily set with reduced danger of improper selection. An automatic/manual switch is operated in association with a lens aperture ring to select one of an automatic aperture mode and a manual aperture mode for a lens of the camera. A mode A counter responds to the output of the automatic/manual switch to be made active when the automatic aperture mode is selected, and a mode M counter responds to the automatic/manual switch to be made active when the manual mode is selected. The output of one of the mode A counter and the mode M counter is selected for counting signals from the up or down switch to thereby set the exposure mode according to a count value so obtained.

7 Claims, 9 Drawing Figures

FIG. 4A

| Q2 | Q1 | MODE |
|---|---|---|
| 0 | 0 | PRGRMD. AUTO. MODE |
| 0 | 1 | |
| 1 | 0 | APERTURE PRIORITY MODE |
| 1 | 1 | SHUTTER PRIORITY AUTO. MODE |

FIG. 4D

| Q2 | Q1 | MODE |
|---|---|---|
| 0 | 0 | APERT. PRIORITY MODE |
| 0 | 1 | MANUAL MODE |
| 1 | 0 | FLASH |
| 1 | 1 | BULB |

FIG. 4B

| Q4 | Q3 | Q2 | Q1 | SHUTTER SPEED |
|---|---|---|---|---|
| 0 | 0 | 0 | 0 | 15" |
| 0 | 0 | 0 | 1 | 8" |
| 0 | 0 | 1 | 0 | 4" |
| 0 | 0 | 1 | 1 | 2" |
| 0 | 1 | 0 | 0 | 1 |
| 0 | 1 | 0 | 1 | 2 |
| 0 | 1 | 1 | 0 | 4 |
| 0 | 1 | 1 | 1 | 8 |
| 1 | 0 | 0 | 0 | 15 |
| 1 | 0 | 0 | 1 | 30 |
| 1 | 0 | 1 | 0 | 60 |
| 1 | 0 | 1 | 1 | 125 |
| 1 | 1 | 0 | 0 | 250 |
| 1 | 1 | 0 | 1 | 500 |
| 1 | 1 | 1 | 0 | 1000 |
| 1 | 1 | 1 | 1 | 2000 |

FIG. 4C

| Q4 | Q3 | Q2 | Q1 | F VALUE |
|---|---|---|---|---|
| 0 | 0 | 0 | 0 | 1.2 |
| 0 | 0 | 0 | 1 | 1.4 |
| 0 | 0 | 1 | 0 | 1.7 |
| 0 | 0 | 1 | 1 | 2 |
| 0 | 1 | 0 | 0 | 2.5 |
| 0 | 1 | 0 | 1 | 2.8 |
| 0 | 1 | 1 | 0 | 3.5 |
| 0 | 1 | 1 | 1 | 4 |
| 1 | 0 | 0 | 0 | 4.5 |
| 1 | 0 | 0 | 1 | 5.6 |
| 1 | 0 | 1 | 0 | 8 |
| 1 | 0 | 1 | 1 | 11 |
| 1 | 1 | 0 | 0 | 16 |
| 1 | 1 | 0 | 1 | 22 |
| 1 | 1 | 1 | 0 | 32 |
| 1 | 1 | 1 | 1 | 45 |

AUTOMATIC EXPOSURE CAMERA

BACKGROUND OF THE INVENTION

The present invention relates to a device for setting camera input data such as an exposure mode, a shutter speed, aperture value, film sensitivity and exposure factor for a still camera such as a single-lens reflex camera.

In order to control the exposure of a single-lens reflex camera, four exposure control methods, namely, an aperture-priority automatic exposure control method, a shutter-speed-priority automatic exposure control method, a programmed automatic exposure control method, and a manual exposure control method have heretofore been employed.

In order to perform aperture-priority automatic exposure, first a mode selector dial is set at an aperture-priority position, and then the lens aperture ring is turned to obtain the desired aperture value. In order to perform shutter-speed-priority automatic exposure, the lens aperture ring is locked at an automatic aperture position, and the mode selector dial is set at a desired shutter speed position. In order to perform programmed automatic exposure, the lens aperture ring is set at the automatic aperture position, and the setting dial is turned to a programmed automatic position. Finally, in order to perform manual exposure, the setting dial is set at a desired shutter speed position, and the lens aperture ring is turned from the automatic position to a desired aperture value.

In general, the mode selector dial has, in addition to the above-described four photographic mode positions, a bulb mode position to permit bulb or electronic flash photographing operations.

The above-described conventional camera suffers from a difficulty that errors are liable to occur in setting the exposure mode. For instance, when it is required to perform a photographing operation in the shutter-speed-priority automatic exposure mode, if the mode selector dial is mistakenly set to the "bulb" position with the lens aperture ring set at the automatic aperture position, the shutter speed will be incorrect and the exposure consequently not correct. There is also the difficulty that the lens aperture ring may be turned from the automatic aperture position and the camera operated in the manual exposure mode when the operator believes that the setting dial had been set to a desired shutter speed and the camera operated in the shutter-speed-priority automatic exposure mode. In this case also, the exposure will not be correct.

SUMMARY OF THE INVENTION

In view of the above-described difficulties accompanying a conventional camera operable in four exposure modes, an object of the invention is to provide an automatic exposure camera in which the four modes, namely, the aperture-priority automatic exposure mode, the shutter-speed-priority automatic exposure mode, the programmed automatic exposure mode and the manual exposure mode, can be positively set.

In satisfaction of the above and other objects, the invention provides an automatic exposure camera in which, when the lens aperture ring is set at the automatic aperture position, only the shutter-speed priority automatic exposure, aperture-priority automatic exposure or programmed automatic exposure can be selected by the combination of a mode switch and an up switch or down switch, and, when the lens aperture ring is set at the manual position, only the bulb mode, flash synchronization mode, manual exposure mode or aperture-priority automatic exposure mode can be selected.

BRIEF DESCRIPTION OF THE DRAWINGS

FIG. 4 is a diagram indicating modes and data for the output bits of the mode A counter, a mode M counter, the TV counter and an AV counter.

DESCRIPTION OF THE PREFERRED EMBODIMENTS

Figure 1A:
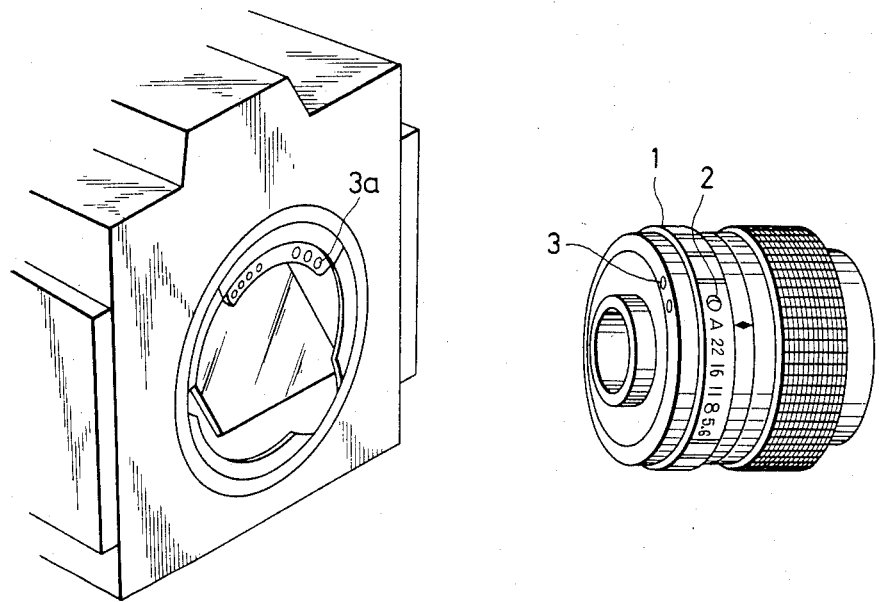
FIGS. 1A and 1B are perspective views showing the positions of pushbutton switches and an automatic aperture lock pin in a camera according to a preferred embodiment of the invention.
Figure 1B:
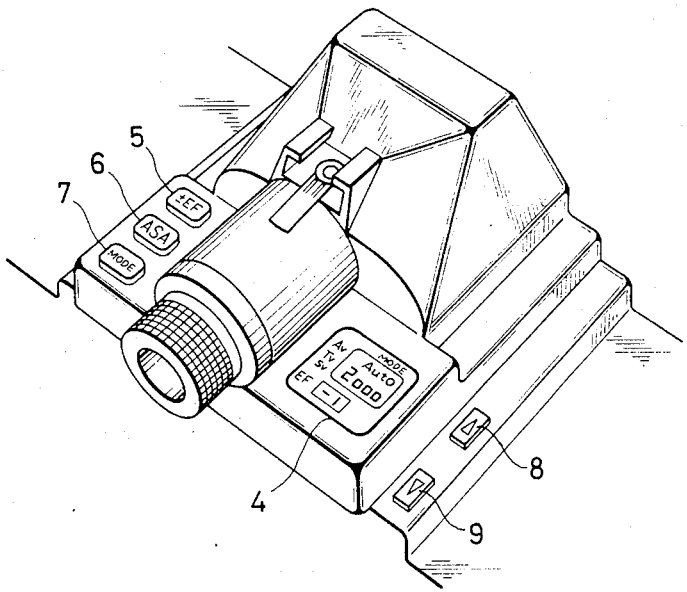

FIGS. 1A and 1B are explanatory diagrams showing the positions of a pushbutton switch, a display unit and an automatic exposure lock pin in an automatic exposure camera according to the invention.

More specifically, FIG. 1A shows a connecting section between the camera body and a lens. As shown in FIG. 1A, the automatic aperture lock pin 2 is provided on a lens aperture ring 1. When the lock pin 2 is locked, the automatic aperture modes are enabled, and when it is unlocked, the manual aperture modes are enabled. A switch SW1 (FIG. 2) is operated in association with the automatic aperture lock pin 2 so that lens data from the switch SW1 is transmitted to a lens data contact 3. The lens data thus transmitted is applied to a lens data contact 3a on the camera body and processed as mode selection data.

FIG. 1B shows the top of the camera body where the display unit 4, an exposure factor setting button 5, a film sensitivity setting button 6, a mode setting button 7, an up select button 8 and a down select button 9 are mounted. The display unit 4 provides to the photographer an indication of automatic or manual mode (AUTO or M), and the shutter speed, aperture value, and exposure factor.

Figure 2:
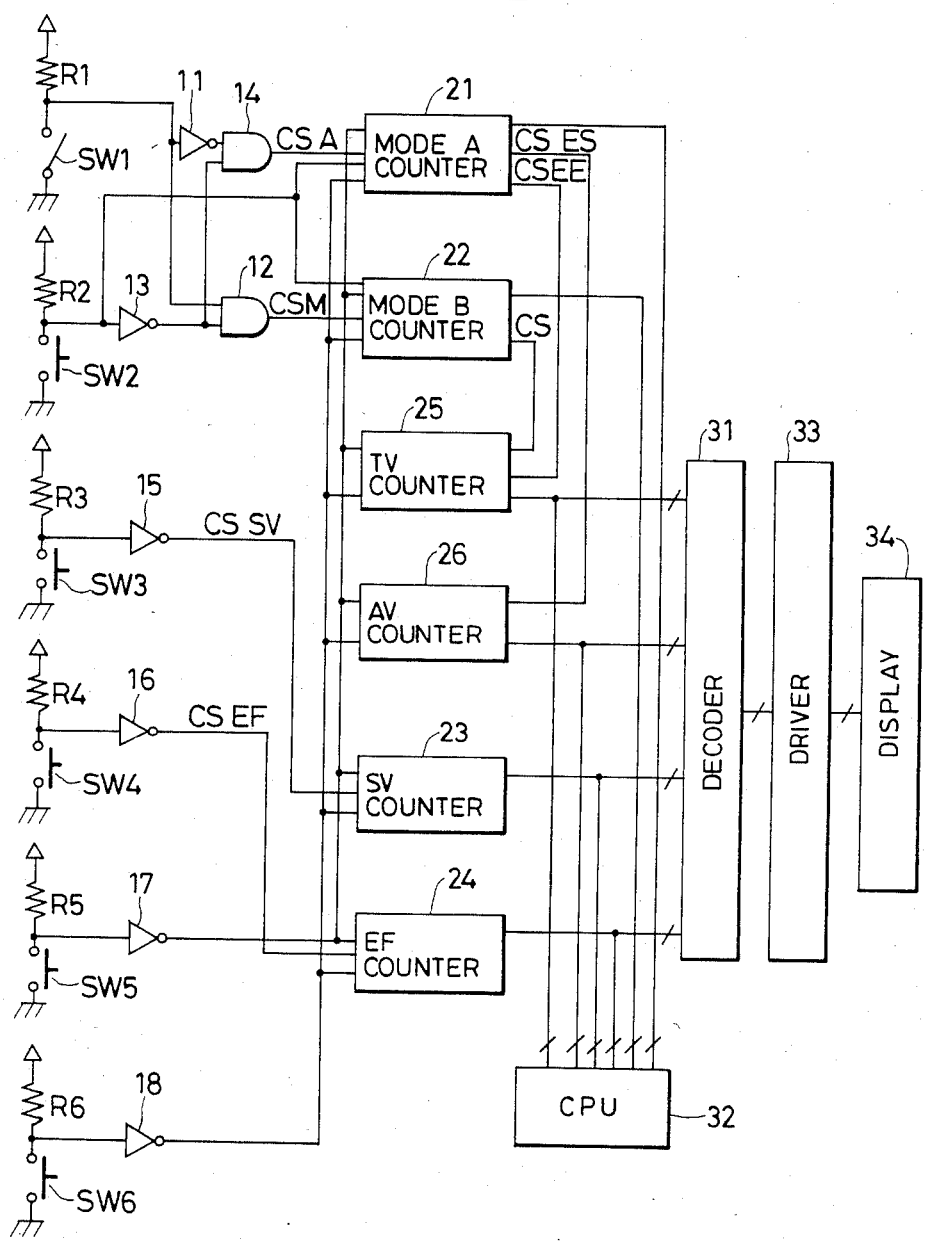
FIG. 2 is a block diagram showing an electrical circuit used in a camera of the invention.

FIG. 2 is an electrical circuit diagram for the automatic exposure camera according to the invention.

Switches SW1, SW2, SW3, SW4, SW5 and SW6 are provided for the automatic aperture lock pin 2, the mode setting button 7, the film sensitivity setting button 6, the exposure factor setting button 5, the up select button 8, and the down select button 9, respectively. The switch SW1 is an automatic/manual switch for selecting the automatic aperture mode or the manual aperture mode of the lens, and is operated in association with the lens aperture ring.

A mode A counter 21 becomes active when the automatic/manual switch SW1 selects the automatic aperture mode. A mode M counter 22 becomes active when the switch SW1 selects the manual aperture mode.

A TV counter 25 calculates the shutter speed, while an AV counter 26 calculates the aperture value. An SV counter 23 calculates the film sensitivity, and an EF counter 24 sets the exposure factor. The above-described counters 21, 22, 25, 26, 23 and 24 are up-down counters.

First terminals of resistors R1, R2, R3, R4, R5 and R6 are connected to first terminals of the switches SW1, SW2, SW3, SW4, SW5 and SW6, respectively, and the second terminals of the switches are all grounded. The second terminals of the resistors R1 through R6 are connected to a power source. The connecting point of the resistor R1 and the switch SW1 is connected to the input terminal of an inverter 11 and to one input terminal of an AND gate 12. The connecting point of the resistor R2 and the switch SW2 is connected to an input terminal of the mode A counter 21, an input terminal of the mode M counter 22, and to the input terminal of an inverter 13. The output terminal of the inverter 13 is connected to one input terminal of an AND gate 14 and to the other input terminal of the AND gate 12. The output terminal of the inverter 11 is connected to the other input terminal of the AND gate 14, the output terminal of which is connected to the mode A counter 21. The output terminal of the AND gate 12 is connected to the mode M counter 22.

The connecting point of the resistor R3 and the switch SW3 is connected through an inverter 15 to the SV counter 23. The connecting point of the resistor R4 and the switch SW4 is connected through an inverter 16 to the EF counter 24. The connecting point of the resistor R5 and the switch SW5 is connected to the input terminal of an inverter 17. The connecting point of the resistor R6 and the switch SW6 is connected to the input terminal of an inverter 18. The output terminals of the inverters 17 and 18 are connected to the mode A counter 21, the mode M counter 22, the SV counter 23, the EF counter 24, the TV counter 25, and the AV counter 26. Output terminals of the mode A counter 21 are connected to the TV counter 25 and the AV counter 26, respectively. An output terminal of the mode M counter 22 is connected to the TV counter 25. Output terminals of the TV counter 25, the AV counter 26, the SV counter 23 and the EF counter 24 are connected to a decoder 31 and a CPU 32. In FIG. 2, a signal line marked with a short oblique line is intended to mean that the line consists of a plurality of lines. The decoder 31 is connected through a driver 33 to a display unit 34.

The operation of the electrical circuit shown in FIG. 2 will be described.

First, the case where the lens is stopped automatically will be described. In this case, the automatic/manual switch SW1 provided for the automatic aperture lock pin 2 is turned on, and therefore the output signal of the inverter 11 is raised to a high level H. The H signal is applied to the AND gate 14. At the same time, a low level L signal produced when the switch SW1 is turned on is applied to the AND gate 12.

On the other hand, as the mode switch SW2 provided for the mode setting button is off, an H signal is applied to the inverter 13. Accordingly, the output of the inverter 13 is set to L. Thus, the other inputs of the AND gates 12 and 14 are both at L. Accordingly, when the mode switch SW2 is in the off state, a chip select signal CSM outputted by the AND gate 12 and a chip select signal CSA outputted by the AND gate 14 are maintained at L.

When under this condition, the mode setting button 7 is depressed, the switch SW2 is turned on so that the output of the inverter 13 is raised to H. Thus, the two inputs of the AND gate 14 are at H, and the chip select signal CSA is raised to H. The chip select signal CSM of the AND gate 12 is at L because its input connected to the switch SW1 is at L.

When the chip select signal CSA is raised to H, the mode A counter 21 becomes active to receive a signal from the up switch SW5 provided for the up select button 8 and a signal from the down switch SW6 provided for the down select button 9.

Assuming a two-bit up-down counter is employed as the mode A counter 21, four different modes, corresponding to counter output values of "00", "01", "10" and "11", can be set by using the signals from the up switch SW5 and the down switch SW6. In the above-described embodiment, the modes are classified as an aperture-priority automatic exposure mode, a shutter-speed-priority automatic exposure mode and a programmed automatic exposure mode, and one of these modes is selected.

It is assumed that the aperture-priority automatic exposure mode is selected by operating the up switch SW5 or the down switch SW6. In this case, a chip select signal CSES is applied to the signal line connected between the mode A counter 21 and the AV counter 26 so that the latter becomes active. When, under this condition, the mode switch SW2 is turned off and the up switch SW5 or the down switch SW6 is depressed, the counting operation of the AV counter SW6, which has been selected by the chip select signal CSES, is advanced. In the up-count operation, the content of the counter changes for instance as follows:

$F$1.2  1.4  2  2.8  4  5.6
8    11   16 22   32 45

In the down-count operation, the content changes in the reverse order.

The case where the shutter-speed-priority automatic exposure mode is selected will now be described.

In this case, the mode setting switch SW2 and the up switch SW5 or the down switch SW6 are operated to select a chip select signal CSEE from the mode A counter 21 to make the TV counter 25 active. When, under this condition, the mode setting switch SW2 is turned off and the up switch SW5 or the down switch SW6 is depressed, the count value of the TV counter 25 is changed. By depressing the up switch SW5, the shutter speed is incremented in steps as follows:

1    1/2   1/4   1/8  1/15 1/30
1/60   1/125 1/250 1/500 1/1000

By depressing the down switch SW6, the shutter speed is decreased in the reverse order.

When the programmed automatic exposure mode is selected as a mode of the mode A counter 21, the photographer cannot select a shutter speed and an aperture value, and therefore no chip select signal is outputted.

In any one of the above-described modes, the outputs of the counters are applied through two-bit bus lines to the CPU 32 where they are subjected to calculation.

The case where the lens is stopped manually will now be described.

In this case, the automatic/manual switch SW1 is turned off. In contrast to the case where the lens is stopped automatically, when the switch SW2 is turned on, the two inputs to the AND gate 12 are raised to H, and accordingly the chip select signal CSM is raised to H. One of the inputs of the AND gate 14 is raised to H, while the other is set to L, and therefore the chip select signal CSA is set to L.

As a two-bit up-down counter is employed as the mode M counter 22, four modes, corresponding to counter output values of "00", "01", "10" and "11", can be set by using the signals from the up switch SW5 and the down switch SW6. In the above-described embodiment, the four modes are the bulb mode, the flash synchronization speed mode, the manual exposure mode, and the aperture-priority automatic exposure mode, and any one the four modes can be selected. Accordingly, when the up switch SW5 or the down switch SW6 is turned on with the chip select signal CSM being at H, the content of the mode M counter 22 can be changed.

If, for instance, the content of the mode M counter 22 is set to "01" by depressing the up switch SW5, then the manual exposure mode is obtained. In this case, a chip select manual signal is applied from the mode M counter to the TV counter 25.

When the chip select manual signal is raised to H, the TV counter 25 becomes active, thus performing an up-count operation or a down-count operation in response to operation of the up switch SW5 or the down switch SW6. The operation of the TV counter 25 in this case is the same as the above-described operation of the mode A counter when the automatic/manual switch SW1 is turned on and the chip select signal CSEE is at H in the shutter-speed-priority automatic exposure mode.

When the output of the mode M counter 22 is that corresponding to the bulb mode, the flash synchronization speed mode or the aperture-priority automatic exposure mode, the shutter speed and the aperture value are not controlled by the up switch SW5 and the down switch SW6, and therefore no chip select signal is produced. In each of these modes, two-bit data is applied through the bus lines to the CPU 32 so as to be subjected to calculation.

The film sensitivity setting operation will now be described.

When the SV switch SW3 operated in association with the film sensitivity setting button 6 is off, the output of the inverter 15 (a chip select signal CSSV) is at L. When the SV switch SW3 is turned on, the chip select signal is raised to H so that the SV counter 23 becomes active. If, under this condition, the up switch SW5 or the down switch SW6 is turned on, the content of the SV counter can be changed. SV data set by the SV counter 23 is applied through the bus line to the CPU 32 and there subjected to operations as required.

The exposure factor setting operation will be described below.

When the EF switch SW4 provided for the exposure factor setting button 5 is off, the output of the inverter 16 (a chip select signal CSEF) is at L. When, under this condition, the EF switch SW4 is turned on, the input of the inverter 16 is set to L, and therefore the chip select signal CSEF is raised to H. If, under this condition, the up switch SW5 or the down switch SW6 is turned on, the content of the EF counter 24 can be changed.

The count data outputs of the TV counter 25, the AV counter 26, the SV counter 23 and the EF counter 24 are applied through the bus lines to the CPU 32 and the decoder 32. The data of each counter is converted into display data by the decoder, and the display data thus obtained is applied through the driver 33 to the display unit 34 where it is displayed.

Figure 3:
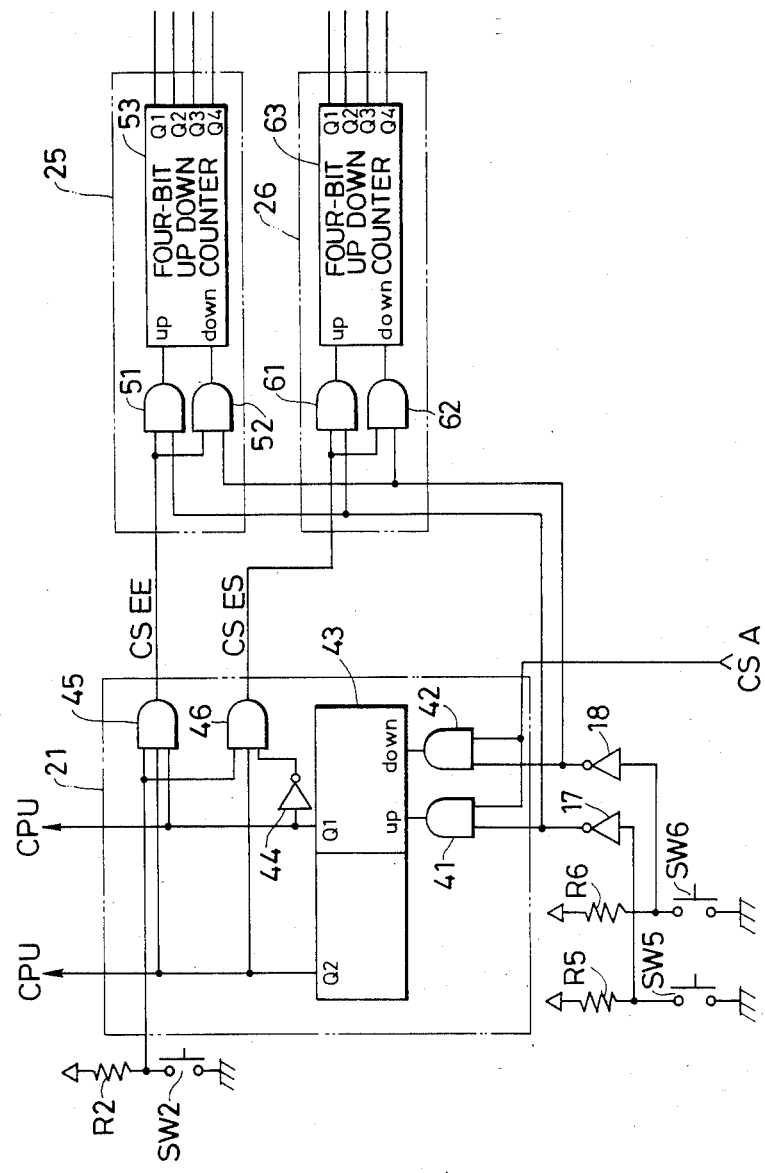
FIG. 3 is a circuit diagram showing a mode A counter and a TV counter and their related circuits in detail.

FIG. 3 shows the mode A counter 21, the TV counter 25, the AV counter 26 and their peripheral circuits in more detail.

The output terminal of the inverter 17 is connected to one input terminal of an AND gate 41, and the output terminal of the inverter 18 is connected to one input terminal of an AND gate 42. A chip select A signal is applied to the other input terminals of the AND gates 41 and 42. The output terminals of the AND gates 41 and 42 are connected to a two-bit up-down counter 43. The Q1 output of the up-down counter 43 is connected to the input terminal of an inverter 44 and to one input terminal of an AND gate 45. The Q2 output terminal of the up-down counter 43 is connected to an input terminal of the AND gate 45 and to an input terminal of the AND gate 46.

The connecting point of the resistor R2 and the switch SW2 is connected to the remaining input terminals of the AND gates 45 and 46. The Q1 and Q2 outputs of the up-down counter 43 are applied through bus lines to the CPU. The output terminal of AND gate 45 are connected to first input terminals of AND gates 51 and 52. The remaining input terminal of the AND gate 51 is connected to the output terminal of the inverter 17. The remaining input terminal of the AND gate 52 is connected to the output terminal of the inverter 18. The output terminals of the AND gates 51 and 52 are connected to a four-bit up-down counter 53.

The output terminal of the AND gate 46 is connected to first input terminals of AND gates 61 and 62. The remaining input terminal of the AND gate 61 is connected to the other input terminal of the AND gate 51. The remaining input terminal of the AND gate 62 is connected to the other input terminal of the AND gate 52. The output terminals of the AND gates 61 and 62 are connected to a four-bit up-down counter 63.

The AND gates 41, 42, 45 and 46, the up-down counter 43 and the inverter 44 form the mode A counter 21. The AND gates 51 and 52 and the up-down counter 53 form the TV counter 25. The AND gates 61 and 62 and the up-down counter 63 form the AV counter 26.

The operation of the circuit in FIG. 3 will be described.

FIGS. 4A through 4D are tables indicating modes and data for the bits of the mode A counter, the TV counter and the AV counter. The operation of the above circuit will be described with reference to FIGS. 4A through 4D.

In the circuit of FIG. 2, when the automatic/manual switch SW1 is turned on (set to the AUTO position) and the mode switch SW2 is turned on, the chip select signal CSA is raised to H. When, under this condition, the up switch SW5 is turned on, both inputs of the AND gate 41 are at H, and the output of the AND gate 41 is raised to H. Accordingly, the count value of the up-down counter 43 is increased by one. When, on the other hand, the down switch SW6 is turned on, the output of the inverter 18 is raised to H, and both inputs of the AND gate 42 are held at H, as a result of which the output of the AND gate 42 is raised to H. Accordingly, the count value is decreased by one.

By operating the up switch, the Q1 and Q2 outputs of the two-bit up-down counter 43 are both set to 1. In this case, the mode switch SW2 is held turned on and the input signal lines to the AND gates 45 and 46 are at L. Therefore, both the chip select signals CSEE and CSES are at L. When, under this condition, the mode switch SW2 is turned off, all the inputs of the AND gate 45 are at H, and the chip select signal CSEE is thus raised to H. On the other hand, as the output of the inverter 44 is at L, the output chip select signal CSES of the AND gate 46 remains at L.

As the chip select signal CSEE has been raised to H, (i.e., the first inputs of the AND gates 51 and 52 are at H) the AND gates 51 and 52 can receive the up signal and the down signal, respectively. That is, when the mode switch SW2 is turned on and the up switch SW5 and the down switch SW6 are turned on, only the up-down counter 43 in the mode A counter 21 is operated. Thereafter, when the mode switch SW2 is turned off, the chip select signal CSA is set to L, and therefore the up-down counter 43 is not operated and only the up-down counter 53 in the TV counter 25 is operated. The output value Q4, Q3, Q2, Q1 of the up-down counter 53 and the shutter value corresponding thereto are as indicated in FIG. 4B.

When the mode switch SW2 and the up switch SW5 or the down switch SW6 are depressed, the Q1 and Q2 outputs of the up-down counter 43 are set to "0" and "1", respectively. In this case also, the output of the mode switch SW2 is at L, and therefore, the chip select signals CSEE and CSES remain at L. When, under this condition, the mode switch SW2 is turned off, the signal line is held at H, as a result of which all the inputs of the AND gate 46 are held at H and the chip select signal CSES is raised to H. On the other hand, as the Q1 output of the up-down counter 43, namely, the input of the AND gate 45 is at L, the chip select signal CSEE is maintained at L.

Since the chip select signal CSES has been raised to H, the AND gates 61 and 62 can receive the up signal and the down signal, respectively. On the other hand, the up signal and the down signal are not applied to the TV counter 25 because the chip select signal CSEE is maintained at L.

The output value Q4, Q3, Q2, Q1 of the four-bit up-down counter 63 in the AV counter 26 and the aperture value corresponding thereto are as indicated in FIG. 4C. In the above-described embodiment, both the up-down counter 53 in the TV counter 25 and the up-down counter 63 in the AV counter 26 are four-bit up-down counters, and the shutter speed for the output of the counter 53 and the aperture value for the output of the counter 53 and the aperture value for the output of the counter 63 are as indicated in FIGS. 4B and 4C, respectively. However, in the case where eight different shutter speeds or aperture values are employed, each of the counters 53 and 63 may be a three-bit up-down counter, and in the case where thirty-two different shutter speeds or aperture values are employed, it should be a five-bit up-down counter.

Next, the mode switch SW2 and the up switch SW5 or down switch SW6 are depressed to set the outputs Q2 and Q1 of the up-down counter 43 to "0" and "0", or "0" and "1". In this case, the Q2 output is always at L, and therefore the outputs of the AND gates 45 and 46 are at L at all times, and the TV counter 25 and the AV counter 26 cannot be selected. In this case, the programmed automatic exposure mode is selected, and the aperture value and the shutter speed are determined by the CPU. The Q2 and Q1 outputs of the up-down counter 43 are applied, as two-bit data, to the CPU 32, where they are operated separately according to the modes.

FIG. 4A indicates the combinations of two-bit outputs Q2 and Q1 of the up-down counter 43 and the modes corresponding thereto. The mode M counter 22, the SV counter 23 and the EF counter 24 all have the same circuit arrangement as the above-described mode A counter 21. FIG. 4D shows the content of the mode M counter 22.

In the above-described embodiment, the SV counter 23 is a five-bit up-down counter in order to provide film sensitivities at $\frac{1}{3}$ EV intervals, and the EF counter 24 is three-bit up-down counter in order to display seven different exposure factors of from $+3$ to $-3$. The outputs of the counters are applied to the CPU 32, in which the following calculations are carried out to control the aperture value and/or the shutter speed:

$$EV = AV + TV = SV - XV + BV,$$

where XV is the exposure factor corresponding to the above-described EF.

Figure 5:
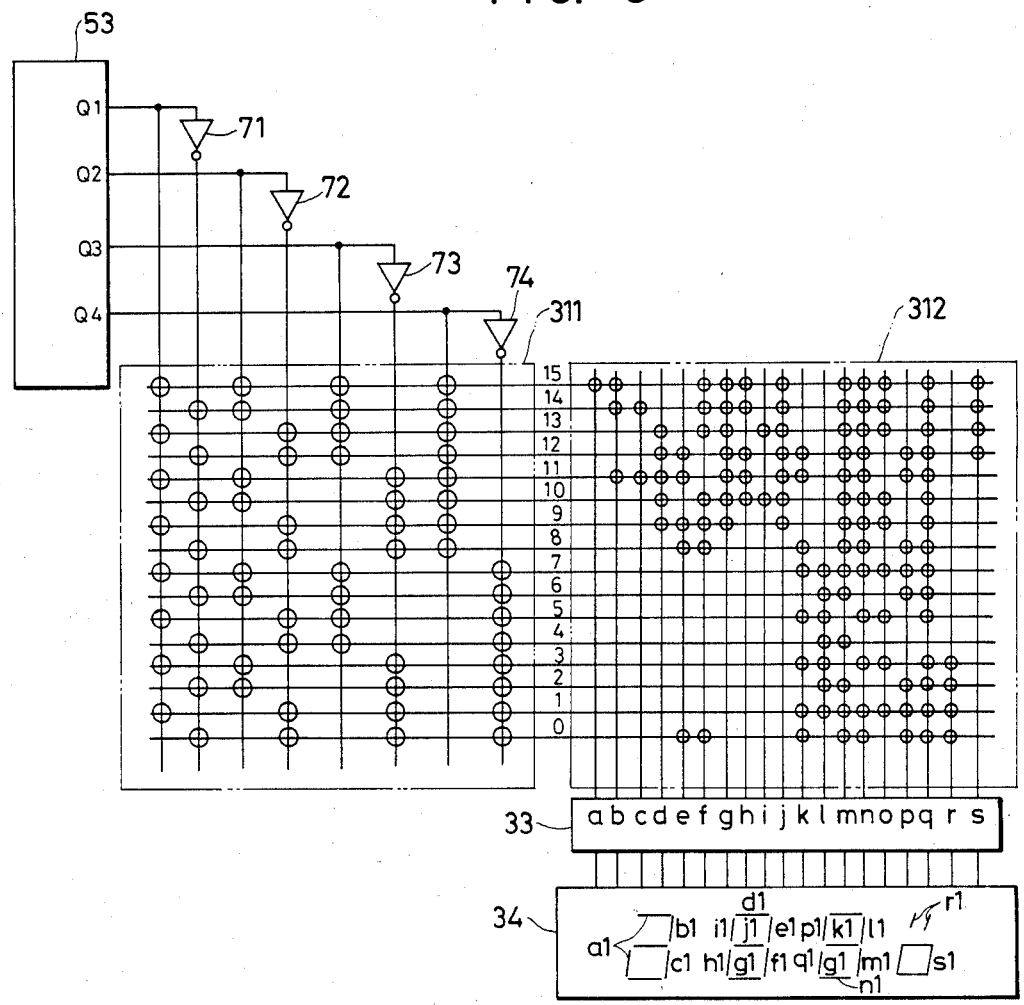
FIG. 5 is a circuit diagram indicating a decoder and a memory used for displaying the output of the TV counter with LEDs.

FIG. 5 shows examples of the decoder and the display unit for displaying the data of the up-down counter.

The Q1 through Q4 output terminals of the four-bit up-down counter 53 are connected to the input terminals of inverters 71 through 74, respectively, so that eight signals, signals Q1, Q2, Q3 and Q4 and signals obtained by inverting these signals are applied to an address decoder 311. Sixteen outputs of the address decoder 311 are applied to a memory 312, nineteen outputs of which are applied to the driver 33. The output of the drive 33 is applied to the display unit 34.

The operation of the circuit in FIG. 5 will be described.

The address decoder 311 is a matrix circuit in which each output line is held at H only in the case where four inputs (each marked with a circle) are at H, and is at L in the other cases. That is, when an input is provided, an output is provided by inverting the input so that one output is selected according to the combinations of inputs and outputs obtained by inverting the inputs.

The following case will be considered with reference to FIG. 5:

$$Q1 = Q2 = Q3 = Q4 = "1".$$

In this case, all four inputs bearing the circular marks are "1" on the uppermost line 15 only, and all of four inputs are not "1" on the remaining lines. In the case of $Q1 = Q2 = Q3 = Q4 = "0"$, the lowermost line 0 where the inverted outputs of the Q1 through Q4 outputs are ANDed is held at "1". Thus, sixteen different outputs can be obtained from the four-bit input from the four-bit up-down counter 53. Among these outputs, only one is selected. The address selected by the address decoder, as described above, is applied to the memory 312. In the memory 312, all the data bits of the value stored at the address thus selected are raised to "1" and applied to the driver 33 to drive the display unit. The number of output data lines of the memory 312 is equal to the number of segments in the display unit 34. The display 34 employs LEDs in the above-described embodiment. Nineteen segments are required for shutter speed displaying LEDs only, and accordingly, the memory 312 requires nineteen data lines.

For instance, in the case of $Q1 = Q2 = Q3 = Q4 = "1"$, the fifteenth address is selected by the address decoder, and the data lines a, b, f, g, h, j, m, n, o, q and s in the fifteenth address in the memory 312 are raised to H. This data value is applied through the decoder 33 to the display unit 34. As a result, the segments al, bl, fl, gl, hl, jl, ml, nl, ol, gl and sl of the display unit 34 are turned on, thus displaying "2 0 0 0", indicative of a shutter speed of 1/2000 second. In the same manner, shutter speeds of from 1/2000 second to 15 seconds can be displayed.

When the lens aperture ring is at the automatic aperture position, the bulb mode and the manual exposure mode cannot be selected. Furthermore, when the lens aperture ring is at the manual aperture position, the programmed automatic exposure mode and the shutter-speed-priority automatic exposure mode cannot be selected. Therefore, the occurrence of errors in setting the exposure mode can be prevented.

In accordance with the invention, the mode setting operation is carried out by operating the mode setting switch and the up switch and the down switch, and the film sensitivity setting operation and the exposure factor setting operation are achieved by operating the film sensitivity switch and the exposure factor switch, respectively, together with the up switch and the down switch. Thus, all needed camera input data, namely, the exposure mode, shutter speed, aperture value, film sensitivity and exposure factor, can be set by pushbutton operation.

When the lens aperture ring is at the automatic aperture position, only the shutter-speed-priority automatic exposure mode or the programmed automatic exposure mode can be selected, and the bulb mode or the manual exposure mode cannot be set.

When the lens aperture ring is at the manual aperture position, only the bulb mode, the flash synchronization speed mode, the manual exposure mode or the aperture-priority automatic exposure mode can be selected, and the programmed automatic exposure mode cannot be selected. Accordingly, the occurrence of errors in setting the exposure mode is prevented. As the film sensitivity setting operation and the exposure factor setting operation can be achieved by pushbutton operation, troublesome dial setting operations are eliminated.

What is claimed is:

1. An automatic exposure camera, comprising:
   an automatic/manual switch operated in association with a lens aperture ring to select one of an automatic aperture mode and a manual aperture mode for a lens of said camera;
   a mode A counter responsive to said automatic/manual switch to be made active when the automatic aperture mode is selected by said automatic/manual switch;
   a mode M counter responsive to said automatic/manual switch to be made active when the manual aperture mode is selected by said automatic/manual switch;
   an up switch;
   a down switch; and
   means for selecting one of said mode A counter and mode M counter to count a signal from said up switch or down switch to set an exposure mode according to a count value thereof.

2. The automatic exposure camera as claimed in claim 1, wherein predetermined output values of said mode A counter are indicative of a programmed automatic exposure mode, an aperture-priority automatic exposure mode, and a shutter-speed-priority automatic mode, and wherein said camera further comprises means for selecting one of said automatic exposure control modes in response to a signal form said up switch or down switch, and wherein predetermined output values of said mode M counter are indicative of a bulb mode, a manual exposure mode, a flash synchronization speed mode and an aperture-priority automatic exposure mode, and wherein said camera further comprises means for selecting one of said manual aperture control modes in response to a signal from said up switch or down switch.

3. The automatic exposure camera as claimed in claim 1, wherein said camera further comprises: a shutter speed counter and an aperture counter having enable inputs coupled to said mode A counter to be selected thereby, said aperture counter being selected in an aperture-priority automatic exposure mode with said mode A counter selected and said shutter speed counter being selected in a shutter-speed-priority automatic exposure mode with said mode A counter selected, wherein upon inputting a signal from said up switch or down switch, an output of said aperture counter or shutter speed counter is changed to change an aperture value or shutter speed value.

4. The automatic exposure camera as claimed in claim 1, wherein said camera further comprises: a shutter speed counter having an enable input coupled to said mode M counter to be selected thereby, said shutter speed counter being selected in a manual exposure mode with said mode M counter selected, wherein, upon inputting a signal from said up switch or down switch, an output of said shutter speed counter is changed to change a shutter speed value.

5. The automatic exposure camera as claimed in claim 1, wherein said camera further comprises: a film sensitivity setting switch operated to set a film sensitivity; and a film sensitivity counter selected upon operation of said film sensitivity setting switch, wherein said film sensitivity setting counter is selected by depressing said film sensitivity setting switch, and said film sensitivity counter changes an output count value thereof upon receiving a signal from said up switch or down switch, thereby to change a film sensitivity setting.

6. The automatic exposure camera as claimed in claim 1, wherein said camera further comprises: an exposure factor setting switch operated to set an exposure factor; and an exposure factor counter selected upon operation of said exposure factor setting switch, wherein said exposure factor counter is selected by depressing said exposure factor setting switch, and said exposure factor counter changes an output count value thereof upon receiving a signal from said up switch or down switch, thereby to change an exposure factor.

7. The automatic exposure camera as claimed in any one of the preceding claims, further comprising means for displaying a shutter speed, an aperture value, a film sensitivity, and an exposure factor according to count values of said shutter speed counter, aperture counter, film sensitivity counter and exposure factor counter, respectively.

* * * * *